June 24, 1930.  H. ROTH  1,768,003
BUOY
Filed Oct. 2, 1929
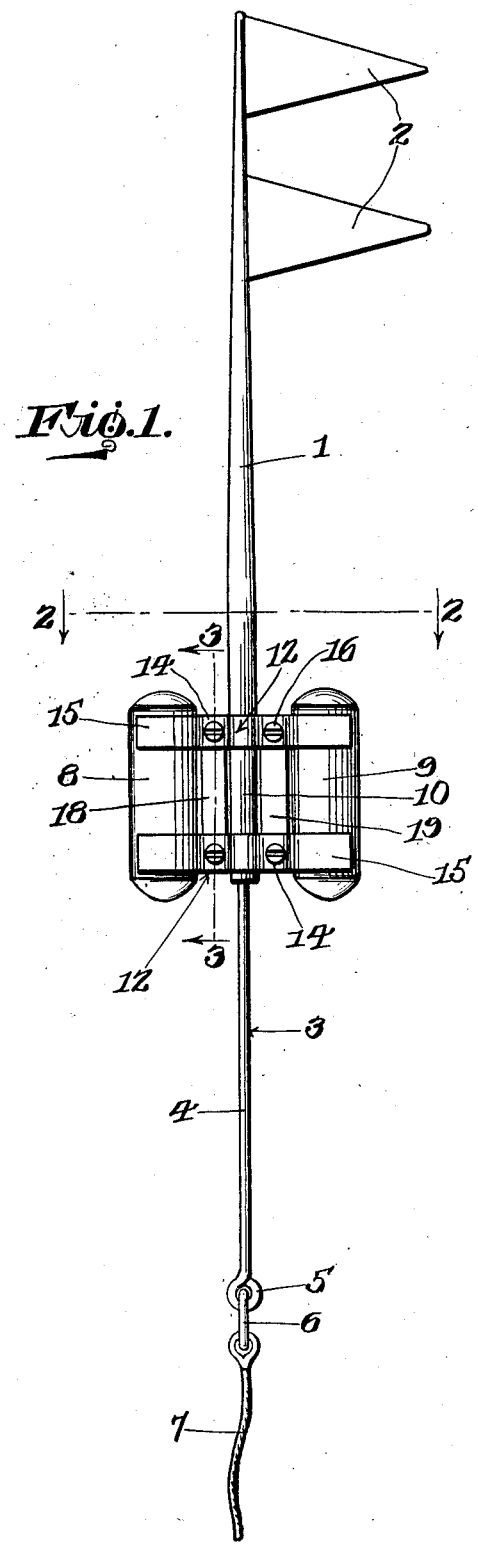
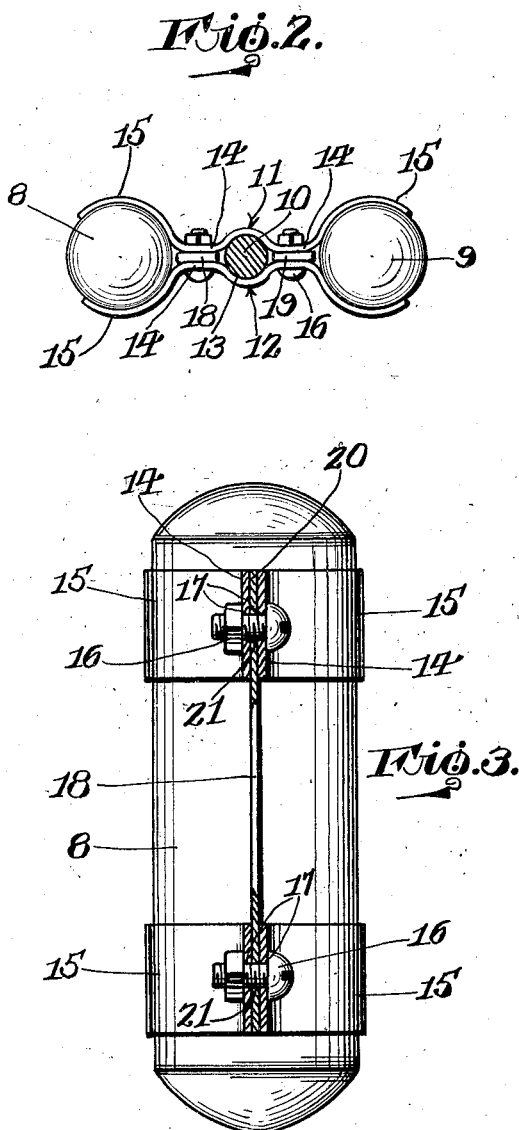
INVENTOR.
Henry Roth,
BY
Geo. P. Kimmel
ATTORNEY.

Patented June 24, 1930

1,768,003

UNITED STATES PATENT OFFICE

HENRY ROTH, OF TWO RIVERS, WISCONSIN

BUOY

Application filed October 2, 1929. Serial No. 396,860.

This invention relates to a buoy designed primarily for use in connection with fishing nets, but it is to be understood that a buoy, in accordance with this invention may be employed in any connection for which it is applicable, and the invention has for its object to provide, in a manner as hereinafter set forth a buoy so constructed and arranged as to reduce to a minimum the twisting thereof which usually culminates in the separation of the buoy from off the line which couples it with the net or other anchorage.

Buoys of the class to which the type of buoy in accordance with this invention belongs, are used in connection with gill nets which are usually set in from ten to one hundred and ten fathoms of water. Buoys now in general use include a float, termed a bowl, formed from wood, preferably cedar of circular cross section and tapered, a flag pole of wood extending from the bowl and a tail piece of iron depending from the bowl. One buoy with two flags is usually attached by a long line to the shore end of the net, and another buoy with one flag is usually attached to the other end of the net. The nets are from ten to thirty miles off shore, and a gang from the inner to the outer end is generally a mile long. The nets are set and left for from three days to a week and the purpose of the buoy is to enable the fishermen to find the nets when they want to lift them. The round wooden bowl has a tendency to start twisting, whenever there is a current, resulting generally in the separation of the buoy from its line whereby the indicating function provided by the buoy is lost, then further the wooden bowl is liable to become water-logged.

To overcome the objections stated in connection with the type of buoys now generally employed in gill net fishing is the aim of this invention, and to this end the invention resides in the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is an elevation of a buoy in accordance with this invention.

Figure 2 is a section on line 2—2 Figure 1.

Figure 3 is a section on line 3—3 Figure 1.

Referring to the drawings in detail 1 denotes a staff for the connecting with the upper end thereof of one or more indicating members, each preferably in the form of a flag. As illustrated the staff 1 has attached to its upper portion a pair of spaced, superposed indicating members 2. The staff 1 tapers from its lower to its upper end and preferably is constructed from wood.

Secured to and depending from the inner or lower end of staff 1 is a tail piece 3 of the desired length, and which is formed from a metallic bar 4 formed at its lower end with an eye 5. Coupled with the eye 5 is a loop or link 6 for connecting the tail piece 3 to the line 7.

A pair of spaced, parallel, hollow, cylindrical metallic floats 8, 9 are coupled with the inner or lower portion 10 of staff 1. The portion 10 is positioned between and spaced from floats 8, 9. Each float is of suitable length, vertically disposed when the buoy is used and has each end 11 thereof rounded.

A pair of superposed, spaced clamps are employed for coupling the floats 8, 9 to the staff portion 10 and for maintaining them in spaced relation with respect to the said portion 10. Each clamp includes a pair of oppositely disposed, strap-like clamping members 11, 12 of like shape, and each of which comprises a semicircular central portion 13, a pair of flat, apertured intermediate portions 14 extending in opposite directions with respect to portion 13, and a pair of curved outer portions 15 which are projected outwardly with respect to portions 14 and are of greater length than portions 13. The portions 15 are of less length than half the diameter of a float, but of a length greater than a quarter of the diameter of the latter. The portions 15 are also of greater length than portions 14.

The portions 13 of members 11, 12 of each clamp oppose each other and embrace the portion 10 of the staff 1. The portions 14 of the members 11, 12 of each clamp oppose each other, and each opposed pair of portions 14 are coupled together by a holdfast device 16 extending through the openings 17 in said portions 14. The portions 15 of the members 11, 12 of each clamp oppose each other and each pair of opposed portions 15 is adapted to partly encompass a float to couple it with the staff. Each portion 15 is resilient to bind against the float. The holdfast devices 16 retain the portions 15 in binding engagement with the floats. The length of each float is materially greater than the width of a member 11 or 12, and when the floats are in position relative to the staff 1, they project above and depend below the clamps, and these latter are arranged in close proximity to the rounded ends of the floats.

The buoy further includes a pair of flat arrester blades which are interposed between the floats and the portion 10 of the staff 1 to prevent rotation or twisting of the buoy. The blades are indicated at 18, 19 and are disposed lengthwise with respect to the floats and the portion 10 of staff 1. The blades are spaced from the floats and the staff, and extend from one clamp to the other. The end portions 20 of the blades are apertured as at 21 and are positioned between the opposed intermediate portions 14 of the clamps. The apertures 21 of the blades register with the openings 17 in said intermediate portions 14 of the clamps. The upper and lower ends of the blades are flush respectively, with the top edge of the upper and the bottom edge of the lower clamp. The holdfast devices 16 secure the end portions of the blades between the opposed intermediate portions 14 of the clamps.

It is thought that the many advantages of a buoy, in accordance with this invention and for the purpose set forth can be readily understood, and although the preferred embodiment of the buoy is as illustrated and described, yet it is to be understood that changes in the details of construction can be had which fall within the scope of the invention as claimed.

What I claim is:

1. A buoy for the purpose set forth comprising an indicator carrying staff, a tail piece extending therefrom, a pair of floats spaced from and opposing opposite sides of the staff, a pair of arrestor blades positioned between the staff and floats, and means common to the floats and blades for coupling them to the staff.

2. A buoy for the purpose set forth comprising an indicator carrying staff, a tail piece extending therefrom, a pair of floats spaced from and opposing opposite sides of the staff, a pair of arrestor blades positioned between the staff and floats, and means common to the floats and blades for coupling them to the staff, said floats positioned adjacent the inner end portion of the staff and disposed lengthwise of the latter, and said blades extending lengthwise with respect to the floats and staff and spaced therefrom.

3. A buoy for the purpose set forth comprising an indicator carrying staff, a tail piece extending therefrom, a pair of floats spaced from and opposing opposite sides of the staff, a pair of arrestor blades positioned between the staff and floats, and means common to the floats and blades for coupling them to the staff, the said means positioned at the ends of the floats and blades.

4. In a buoy of that type including an indicator carrying staff, the combination of a pair of floats adapted to be connected to the staff and positioned in parallel, spaced relation with respect to the latter, and an arrester blade interposed between each float and the staff.

5. In a buoy of that type including an indicator carrying staff, the combination of a pair of floats adapted to be connected to the staff and positioned in parallel, spaced relation with respect to the latter, an arrester blade interposed between each float and the staff, and spaced means common to said floats and blades for coupling them to the staff.

6. In a buoy of that type including an indicator carrying staff, the combination of a pair of hollow, cylindrical floats adapted to be connected to the staff and positioned in parallel, spaced relation with respect to the latter, and an arrester blade interposed between each float and the staff.

7. In a buoy of that type including an indicator carrying staff, the combination of a pair of hollow, cylindrical floats adapted to be connected to the staff and positioned in parallel, spaced relation with respect to the latter, a flat arrester blade interposed between each float and the staff, and spaced means common to said floats and blades for coupling them to the staff.

In testimony whereof, I affix my signature hereto.

HENRY ROTH.